United States Patent [19]

Ottsen et al.

[11] Patent Number: 4,513,401

[45] Date of Patent: Apr. 23, 1985

[54] MARINE CABLE LOCATION SYSTEM

[75] Inventors: Henning Ottsen; Thruburn Barker, both of Ventura, Calif.

[73] Assignee: Mobil Oil Corporation, New York, N.Y.

[21] Appl. No.: 358,755

[22] Filed: Mar. 16, 1982

[51] Int. Cl.³ .............................................. G01V 1/38
[52] U.S. Cl. .......................................... 367/19; 367/6; 367/99
[58] Field of Search ...................... 367/19, 6, 130, 106, 367/99, 16; 181/110

[56] References Cited

U.S. PATENT DOCUMENTS

| 3,469,229 | 9/1969 | Pure et al. | 367/6 |
| 4,388,710 | 6/1983 | Pecon, Jr. | 367/6 |
| 4,446,538 | 5/1984 | Zachariadis | 367/19 |

OTHER PUBLICATIONS

Henry, T. D., "Acoustic Transponder Navigation," 1978 IEEE Conference Position Location and Navigation Symposium, 11/6/78.

Primary Examiner—Nelson Moskowitz
Assistant Examiner—Ian J. Lobo
Attorney, Agent, or Firm—A. J. McKillop; Michael G. Gilman; George W. Hager, Jr.

[57] ABSTRACT

An acoustic positioning system for locating a marine cable at an exploration site employs a plurality of acoustic transponders, each having a characteristic frequency, at spaced-apart positions along the cable. A marine vessel measures the depth to the transponders as the vessel passes over the cable and measures the slant range from the vessel to each of the acoustic transponders as the vessel travels in a parallel and horizontally offset path to the cable.

5 Claims, 3 Drawing Figures

MARINE CABLE LOCATION SYSTEM

BACKGROUND OF THE INVENTION

This invention relates to seismic exploration and more particularly to marine exploration. In marine exploration, seismic energy is generated in the water and reflections and refractions of such energy from subsurface formations are detected by a linear string of detectors or hydrophones. The seismic energy sources and the hydrophones are towed through the water to an exploration site by means of cables extending from a marine vessel. At the exploration site, the exploration operation may be carried out with the seismic detector cable either continuously moved through the water during seismic energy generation or fixed in position in the water layer or on the water bottom. Reflection and refraction signals received by the hydrophones along the detector cable are transferred to the marine vessel through the cable wiring for recording and processing.

During the processing of such seismic signals, precise measurements of the hydrophones are required in order to insure maximum accuracy in the static and dynamic corrections generally applied to the obtained seismic data. One method for determining the instantaneous position of various points along a seismic detector cable is disclosed in U.S. Pat. No. 3,953,827 to Le Moal et al and U.S. Pat. No. 4,231,111 to W. P. Neeley. The position of each selected point is determined by measuring the angle of the tangents of the cable at such points with a fixed and known direction, such as magnetic north. At each measuring point along the cable there is located preferably a magnetic compass. By knowing the heading of the tangents to the cable at such plurality of points along the cable and the distances between each of such points, the location of the cable along its entire length can be estimated.

Other systems are known for locating single objects in large bodies of water utilizing the measurement of the time interval required for an energy pulse to travel underwater between two points. One such system is described in U.S. Pat. No. 3,353,149 to D. H. Frantz, Jr., et al.

SUMMARY OF THE INVENTION

In accordance with the present invention, there is provided a method and system for locating a marine cable at a seismic exploration site. A path is traversed parallel to and offset horizontally from an estimated location of the cable by a vessel having means for measuring the slant range from the vessel to each of the plurality of points along the cable. The water depth at a plurality of identified points along the cable is measured. The horizontal range of the parallel and offset path to the cable at each of the plurality of points is determined from the measurement of slant range and water depth. The exact position of each of the plurality of points along the cable is identified from the horizontal range determinations and the known navigational coordinates of the vessel.

In a more specific aspect, each of the plurality of points along the cable supports an acoustic transponder having a characteristic frequency differing from that of the other acoustic transponders along the cable. The depth of each transponder is measured by sonar as the vessel traverses a path directly over the cable. The slant range from the vessel to each transponder as the vessel traverses at least one parallel and horizontally offset path to the cable is measured a plurality of times by means of a sonar ranging unit located on the vessel. The slant range position for each transponder is identified by the intersection of a set of loci of the plurality of slant range measurements obtained at the characteristic frequency for each transponder. The water depth, particularly where the cable is on the ocean bottom, is measured by sonar as a vessel passes over the estimated location of the cable.

DESCRIPTION OF THE PREFERRED EMBODIMENT

In the development of marine exploration, the seismic detector cables have become quite long, extending for one mile, two miles, or even farther behind the marine vessel. Such lengths can cause problems in accurately determining the position and configuration of the cable since it is unlikely that cables of such lengths will extend in a straight line behind the towing vessel or even be configured in the shape of a single arc of curvature. Rather, the cable may have one or more inflection points in its curvature and may extend laterally to one or even both sides of the towing vessel.

The present invention is therefore directed to a new method for accurately locating and configuring seismic detector cables of great lengths which may be positioned in the water layer or on the ocean bottom. Such method employs a separate marine vessel from the cable towing vessel for carrying out both depth and slant ranging sonar measurements in a new and improved acoustic position system.

Figure 1:
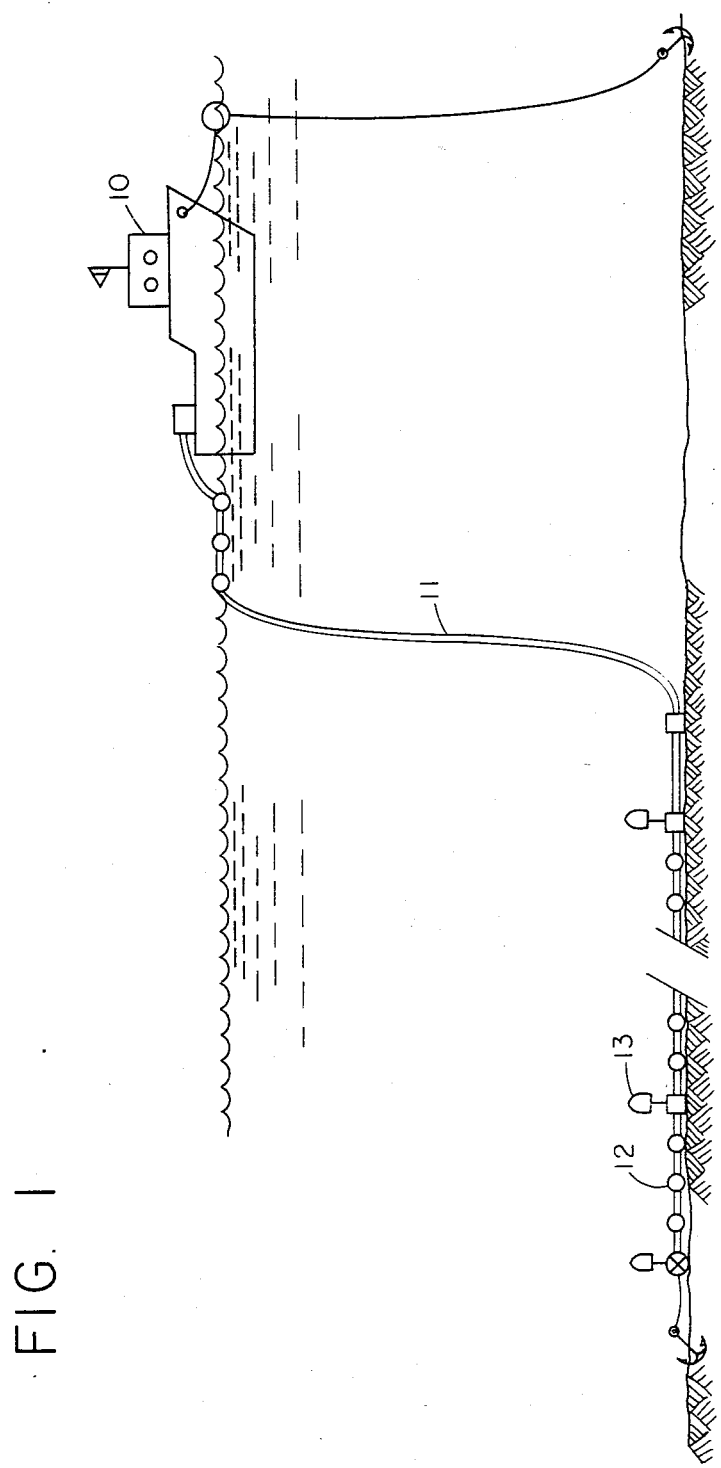
FIG. 1 illustrates a seismic exploration system employing a marine vessel and a marine seismic cable.

Referring now to FIG. 1, there is shown a preferred embodiment of the present invention in which marine vessel 10 deploys a seismic detector cable 11 having a plurality of hydrophones 12 on the ocean bottom along a pre-selected line of exploration. The cable 11 is bottom weighted so that the hydrophones 12 remain fixed in position on the ocean bottom as long as the marine vessel holds a fixed position on the water surface. Having deployed the seismic detector cable, a conventional seismic survey is then carried out by traversing the area with a separate seismic shooting vessel employing one or more seismic energy sources preferably towed through the water by means of a cable extending from such vessel. Seismic energy from such sources is reflected and refracted by the subsurface formations and returns to the earth's surface along the ocean bottom where it is detected by the hydrophones 12 of the seismic detector cable 11 and transmitted to the vessel 10 for recording and processing.

Figure 3:
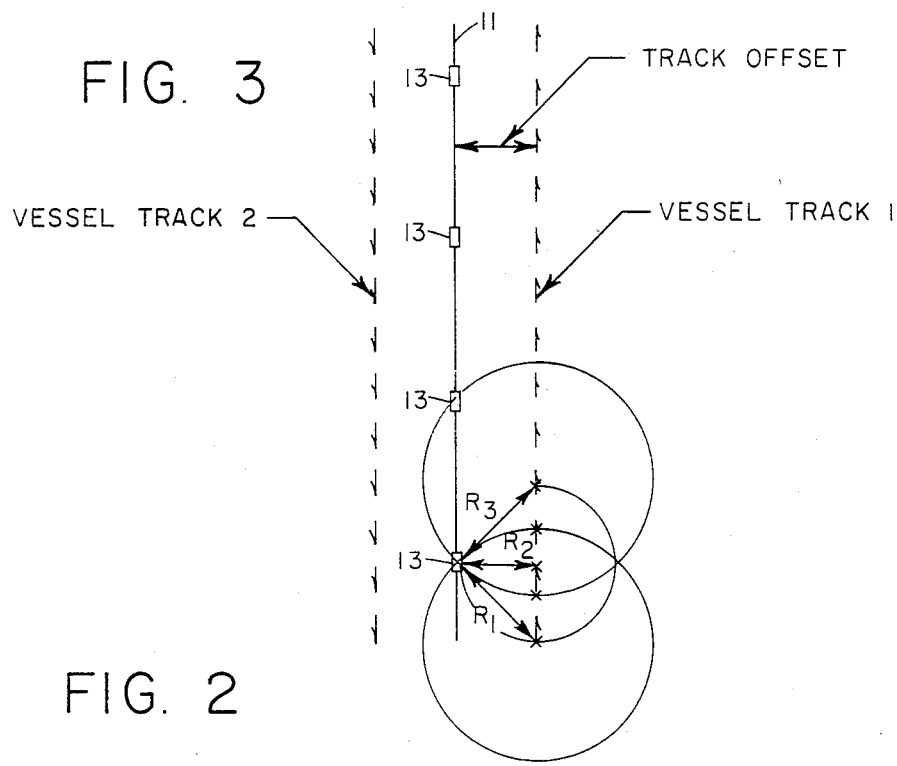
FIGS. 2 and 3 illustrate an acoustic positioning operation for determining the location of the marine seismic cable of FIG. 1.
Figure 2:
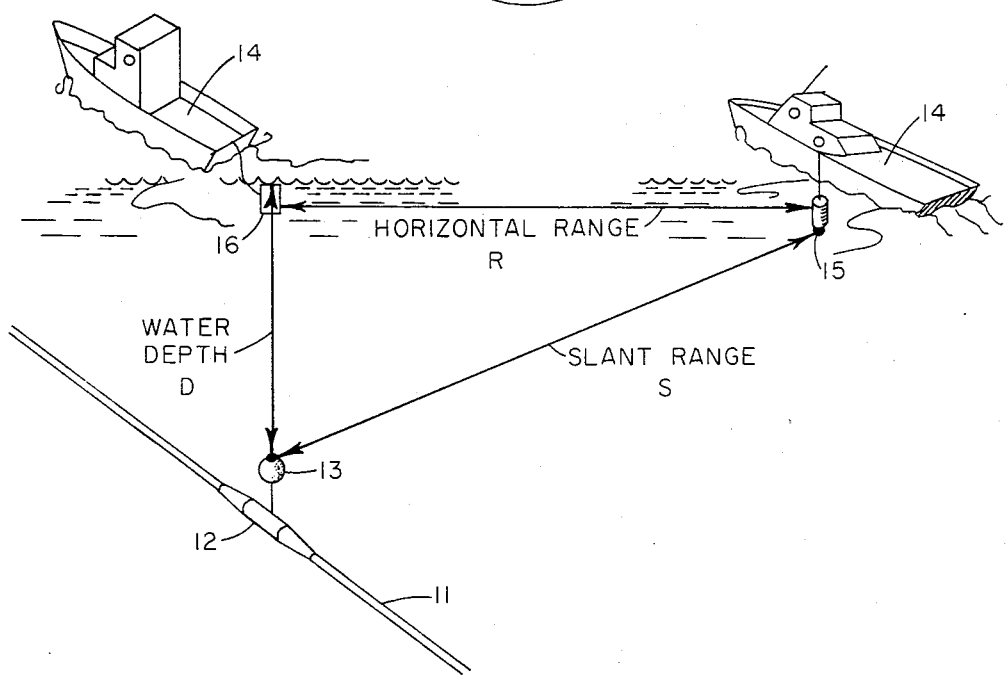

Precise measurement of the location of the hydrophones along the ocean bottom is required in order to accurately process the seismic reflection and refraction signals received during the exploration operation. In accordance with a specific aspect of the present invention, such locations are determinable from two measurements carried out by the acoustic positioning system as illustrated in FIG. 2. Firstly, the vessel 14 traverses a path parallel to and offset from an estimated location for the cable 11, as shown in both FIGS. 2 and 3 and measures the slant range S from the vessel 14 to the cable 11. This slant range measurement is accomplished by employing a plurality of acoustic transponders 13 at spaced positions along the cable 11 and interrogating each such transponder from the vessel 14 by means of a sonar interrogation unit 15. Secondly, the water depth D at which the cable 11 is positioned and measured by passing another vessel 14, such as the shooting vessel one or more times along or in criss-crossing manner directly over the estimated cable location. Knowing the slant range S, water depth D to each transponder 13, sound velocity V through the water and the exact location of the interrogation unit 15, the locus of possible positions for each transponder may be determined. As illustrated in FIG. 3 the vessel 14 moves in a parallel, but offset manner to the estimated location for cable 11, preferably one track on each side of the cable, thereby establishing a set of loci, $R_1$, $R_2$ and $R_3$ for example, the intersections of which define the position of each transponder 13. In a preferred mode of operation, the vessel 14 moves at about one to two knots and the interrogation unit 15 interrogates each transponder 13 twenty to thirty times for each of the two parallel, offset tracts.

In order for the interrogation unit 15 to distinguish between the slant range signals from the plurality of transponders 13, each transponder generates a characteristic frequency signal, such frequencies will be generally in the range of 5 KHz to 100 KHz. In one embodiment, a particularly suitable frequency range utilized is 7.5 KHz to 15 KHz. Knowing the exact position of each transducer 13 along the cable 11, the position of each hydrophone 12 is determined by straight line interpolation.

Such transducer and hydrophone positions are identified relative to the fixed position of the interrogation unit 15 of the vessel 14. The position of the vessel, in terms of latitude and longitude coordinates, and hence the interrogation unit 15, is determined by an on-board navigational system utilizing satellite navigation monitoring and/or radio signals from shore based navigation stations.

The foregoing described method of the present invention may be repeated any number of times to more precisely define the location of the cable. By repeating the described traverses with the vessel 14, the location of the cable is refined to allow for sound refraction effects due to variations in the velocity of sound with water depth.

In the above described preferred embodiment, the vessel navigation system is a Miniranger IV radio navigation system. The water depth system is an EG and G SMS 960 sonar mapping system. The slant ranging system, including acoustic transponders and interrogation unit is an EG and G Sealink ranging sonar positioning system interfaced to an Apple II computer and the Miniranger navigation system. The marine cable is in the order of 3000 meters of active length with acoustic transponders spaced in the order of 300 meters along the cable. Such an acoustic positioning system of the preferred embodiment permits accurate cable position identification in up to 300 meters of water depth.

Although the present invention has been described in connection with a preferred embodiment, various modifications and changes may be made without departing from the spirit and scope of the present invention as set forth in the appended claims.

I claim:

1. A method for locating a marine cable at a seismic marine exploration site, comprising the steps of:

(a) traversing at least one path parallel to and offset horizontally from an estimated location for said cable with a vessel having means for interrogating each of a plurality of acoustic transponders along said cable, (b) interrogating each of said transponders a plurality of times during each traverse of said vessel along said cable, each acoustic transponder transmitting an acoustic signal through the water to said vessel at a characteristic frequency differing from that of the other of said plurality of acoustic transponders each time it is interrogated, (c) receiving said acoustic signals at said vessel and determining a plurality of slant range measurements for each acoustic transponder at the characteristic frequency of said acoustic transponder, (d) measuring the water depth to said cable, (e) plotting a set of loci of all possible positions for each acoustic transponder from the plurality of slant range measurements obtained at each of said characteristic frequencies, the measured water depth to said cable, the known sound velocity in water, and the navigational coordinates of said vessel, and (f) identifying the exact position of each acoustic transponder by the intersection point for the plotted set of loci of possible transducer positions for said acoustic transponder.

2. The method of claim 1 wherein the characteristic frequencies of said acoustic transponders range from 5 KHz to 100 KHz.

3. An acoustic positioning system for locating a marine cable at a seismic marine exploration site, comprising:

(a) a plurality of acoustic transponders located at spaced-apart positions along said marine cable, each transponder producing an acoustic signal at a characteristic frequency differing from that of the other of said plurality of transponders;

(b) a marine vessel having a sonar system for measuring water depth of said cable when the vessel passes directly over said cable and a sonar ranging system for producing a plurality of slant range measurements from the vessel to each acoustic transponder as identified by the characteristic frequency of said transponder as the vessel passes in a parallel and horizontally offset path to said cable; and (c) means for identifying all possible positions for each of said transponders from
  (i) the water depth measurements,
  (ii) the plurality of slant range measurements corresponding to each of said characteristic frequencies,
  (iii) the velocity of sound in water, and
  (iv) the latitude and longitude of the marine vessel, and (d) a plotter for recording the set of loci for all of said possible positions for each acoustic transponder, the intersection points on each of said loci plots uniquely identifies the exact position of each of said acoustic transponders.

4. The acoustic positioning system of claim 3 wherein the characteristic frequencies of said acoustic transponders range from 5 KHz to 100 KHz.

5. The acoustic positioning system of claim 3 wherein the acoustic transponders are spaced up to several hundred meters apart along said cable and said cable is located at a water depth of up to several hundred meters.

* * * * *